United States Patent
Prat et al.

(10) Patent No.: US 10,511,255 B2
(45) Date of Patent: Dec. 17, 2019

(54) SYSTEM FOR ATTACHING A PANEL TO A GIRDER, AND SUPPORTING STRUCTURE INCLUDING THE SYSTEM

(71) Applicant: EXOSUN, Martillac (FR)

(72) Inventors: Alexandre Prat, Cocumont (FR); François Paponneau, Cestas (FR)

(73) Assignee: EXOSUN, Martillac (FR)

( * ) Notice: Subject to any disclaimer, the term of this patent is extended or adjusted under 35 U.S.C. 154(b) by 0 days.

(21) Appl. No.: 15/572,344

(22) PCT Filed: May 4, 2016

(86) PCT No.: PCT/FR2016/051065
§ 371 (c)(1),
(2) Date: Nov. 7, 2017

(87) PCT Pub. No.: WO2016/177981
PCT Pub. Date: Nov. 10, 2016

(65) Prior Publication Data
US 2018/0123505 A1    May 3, 2018

(30) Foreign Application Priority Data
May 7, 2015   (FR) ..................................... 15 54130

(51) Int. Cl.
*H02S 20/23*      (2014.01)
*H02S 20/32*      (2014.01)
(Continued)

(52) U.S. Cl.
CPC ................ *H02S 20/32* (2014.12); *F16B 2/12* (2013.01); *F24S 25/20* (2018.05); *F24S 25/33* (2018.05); *F24S 25/636* (2018.05)

(58) Field of Classification Search
CPC . H02S 20/12; F24J 2/52; F24J 2/5205; F16M 13/00
See application file for complete search history.

(56) References Cited

U.S. PATENT DOCUMENTS

| 5,571,338 A | 11/1996 | Kadonome et al. |
| 8,505,864 B1 * | 8/2013 | Taylor .................. F24S 25/636 248/237 |

(Continued)

FOREIGN PATENT DOCUMENTS

| DE | 202010010969 U1 | 10/2010 |
| DE | 202012005671 U1 | 7/2012 |

(Continued)

OTHER PUBLICATIONS

International Search Report for PCT Patent App. No. PCT/FR2016/051065 (dated Aug. 23, 2016) with English language translation thereof.

(Continued)

*Primary Examiner* — Beth A Stephan
(74) *Attorney, Agent, or Firm* — Kenealy Vaidya LLP

(57) ABSTRACT

Some embodiments relate to an attachment system for attaching at least one panel to a supporting structure that includes at least one girder extending in a first direction, the girder including a holding rim and a surface for bearing the panel thereon. The system includes a flange, a clamp and a clamping assembly linking the flange to the clamp, which are arranged so as to sandwich, during assembly, the holding rim of the girder with the panel so that they bear on the bearing surface of the girder. The clamp includes a first series of teeth projecting towards the flange in a manner substantially parallel to an axis of the clamping assembly. The teeth are to engage, via gripping, with the holding rim of the girder during assembly.

19 Claims, 3 Drawing Sheets

(51) Int. Cl.
*F24S 25/33* (2018.01)
*F24S 25/636* (2018.01)
*F24S 25/20* (2018.01)
*F16B 2/12* (2006.01)

(56) References Cited

U.S. PATENT DOCUMENTS

| | | | |
|---|---|---|---|
| 2006/0118163 A1 | 6/2006 | Plaisted et al. | |
| 2010/0276558 A1* | 11/2010 | Faust | F24J 2/5205 248/222.14 |
| 2012/0102853 A1* | 5/2012 | Rizzo | H02S 20/23 52/173.3 |
| 2012/0248271 A1* | 10/2012 | Zeilenga | H02S 20/00 248/231.41 |
| 2013/0011187 A1* | 1/2013 | Schuit | F16B 2/065 403/287 |
| 2013/0248668 A1 | 9/2013 | Lu et al. | |
| 2013/0320166 A1* | 12/2013 | Kemple | F16B 2/12 248/220.22 |
| 2015/0180404 A1* | 6/2015 | Braunstein | F24S 25/634 136/251 |
| 2016/0111996 A1* | 4/2016 | Stephan | F16B 5/0028 248/316.6 |

FOREIGN PATENT DOCUMENTS

| | | |
|---|---|---|
| EP | 0905795 A2 | 3/1999 |
| WO | WO2013/078533 A1 | 6/2013 |

OTHER PUBLICATIONS

Written Opinion for PCT Patent App. No. PCT/FR2016/051065 (dated Aug. 23, 2016).

* cited by examiner

SYSTEM FOR ATTACHING A PANEL TO A GIRDER, AND SUPPORTING STRUCTURE INCLUDING THE SYSTEM

CROSS REFERENCE TO RELATED APPLICATION(S)

This application is a national phase filing under 35 C.F.R. § 371 of and claims priority to PCT Patent Application No. PCT/FR2016/051065, filed on May 4, 2016, which claims the priority benefit under 35 U.S.C. § 119 of French Patent Application No. 1554130, filed on May 7, 2015, the contents of each of which are hereby incorporated in their entireties by reference.

BACKGROUND

Some embodiments relate to a system for attaching at least one solar panel to a supporting structure of a solar module of a solar tracking unit, and a supporting structure of a solar module forming it.

At the present time, a holding system is used for the purpose of installing a set of solar panels on a solar module of a solar tracking unit, as illustrated for example in document U.S. Pat. No. 6,672,018. This holding system includes a set of longitudinal members having a longitudinally extending opening which imparts a "U"-shaped cross-section to the longitudinal members, the tops of the limbs of the "U" defining a bearing surface on which the solar panels are placed when installed. The latter are held against the edges of the extended longitudinal opening via an attachment assembly. However, use of such a longitudinal member having a "U"-shaped cross-section may be necessary to provide an arrangement at the attachment assembly which prevents the side walls of the longitudinal member forming the limbs of the "U" from moving away from each other during tightening and also prevents the same side walls forming the limbs of the "U" from approaching each other. This leads to the construction of an attachment assembly which is relatively complex to construct and install. In addition to this, the side walls of the longitudinal member forming the limbs of the "U" are not maintained separated from each other between two attachment assemblies, and are therefore free to deform when the set of solar panels mounted on the longitudinal member is subjected to forces due for example to the wind. These mechanical stresses experienced by the longitudinal member have the consequence that it deforms in order to approach a neutral fibre of the longitudinal member, making it weaker.

SUMMARY

One aspect of some embodiments is to provide a system for the attachment of a panel such as a solar panel onto a supporting structure that is simple to implement, while at the same time having optimum mechanical robustness.

Some embodiments are directed to a system for attaching at least one panel, such as a solar panel, onto a supporting structure including at least one longitudinal member extending in a first direction. The longitudinal member includes a folded edge and a surface on which the panel bears. The system includes a flange, a retaining plate and an attachment assembly linking the flange to the retaining plate arranged in such a way that the folded edge receiving the longitudinal member and the panel bearing against the surface of the longitudinal member are sandwiched together during assembly, the retaining plate having a first set of teeth projecting substantially parallel to one axis of the attachment assembly in the direction of the flange, the teeth being intended to engage within the folded edge of the longitudinal member by clamping onto it during assembly.

Advantageously, but optionally, the attachment system according to some embodiments has at least one of the following additional characteristics:
 the first set of teeth is located on a first upturned edge of the retaining plate;
 the retaining plate incorporates a second set of teeth projecting substantially parallel to the axis of the attachment assembly in the direction of the flange, this second set of teeth being intended to engage the edge of the panel by clamping onto it during assembly;
 the second set of teeth is located on the second upturned edge of the retaining plate;
 the first and second upturned edges of the retaining plate are substantially parallel to each other and extend opposite each other;
 the retaining plate incorporates a projecting spacer projecting substantially parallel to the axis of the attachment assembly in the direction of the flange and arranged in such a way that it bears laterally against one edge of the panel during assembly;
 the attachment assembly includes a bolt and a nut; and
 the attachment assembly includes a structural rivet.

Some embodiments are directed to a structure supporting at least one panel, such as a solar panel, including at least one longitudinal member, a folded edge, a bearing surface of the panel, extending in a first direction, and at least one attachment system having at least one of the above technical characteristics, the longitudinal member having a thin wall and a closed cross-section.

Advantageously, but optionally, the supporting structure according to some embodiments has at least one of the following additional characteristics:
 the folded edge extends along a prolongation of the bearing surface;
 the thin wall is formed of a shaped metal sheet; and
 the folded edge is formed by folding the thin sheet onto itself.

BRIEF DESCRIPTION OF THE FIGURES

Other characteristics and advantages of some embodiments will be apparent from the following description of some embodiments together with a variant thereof. In the appended drawings.

DETAILED DESCRIPTION OF THE EMBODIMENTS

Figure 1:
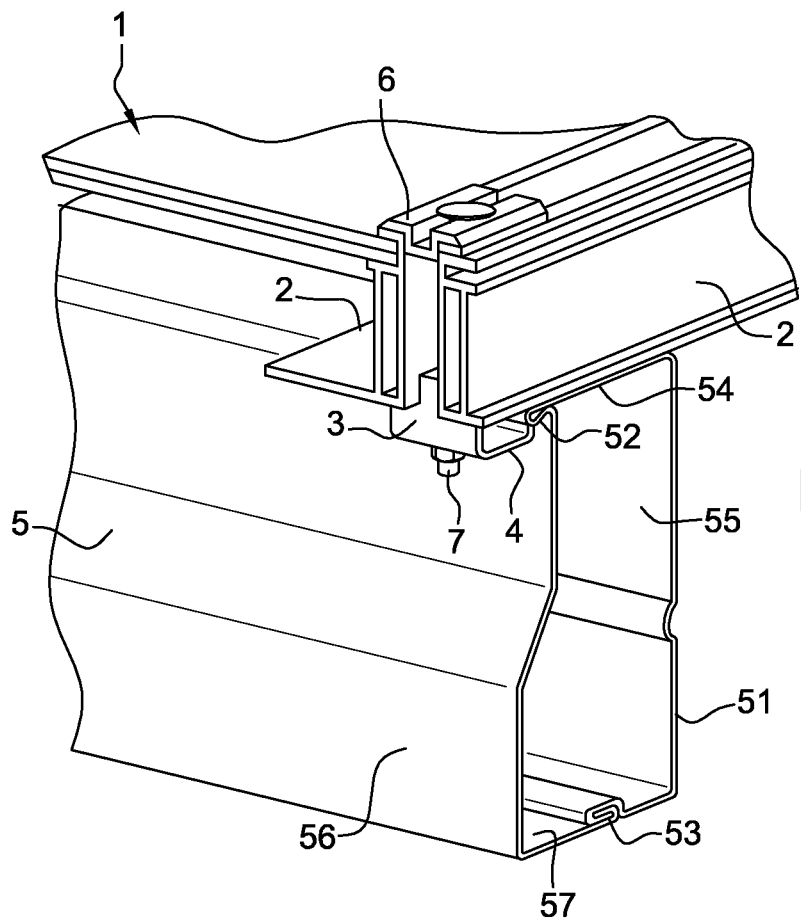
FIG. 1 is a partial three-dimensional view from above of a supporting structure according to some embodiments incorporating an attachment system according to some embodiments.
Figure 2:
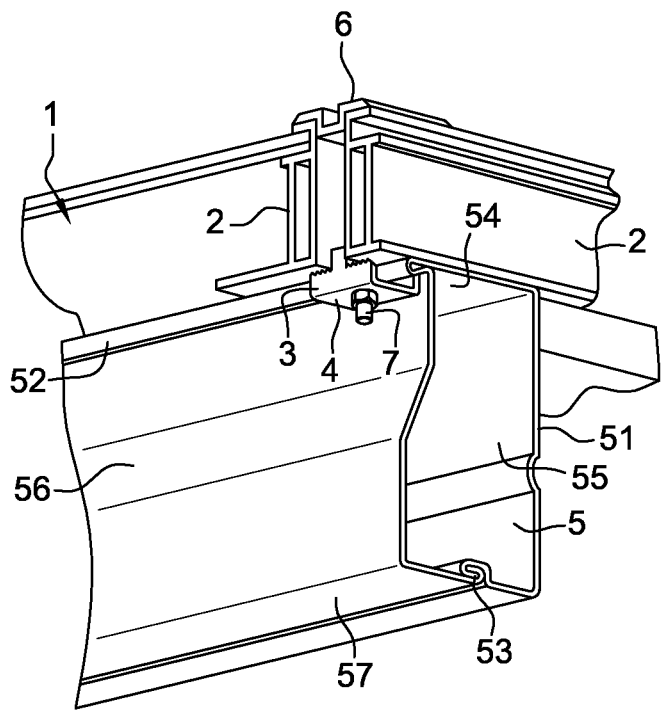
FIG. 2 is a partial three-dimensional view from below of the supporting structure in FIG. 1.
Figure 3:
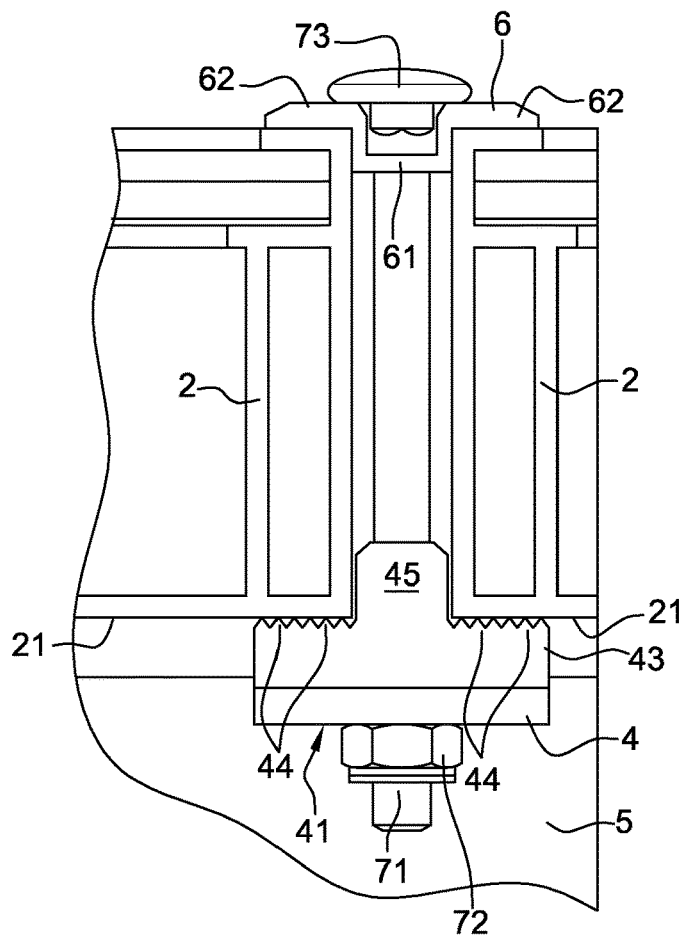
FIG. 3 is a partial view from the side of the supporting structure in FIG. 1 illustrating the attachment system according to some embodiments.
Figure 4:
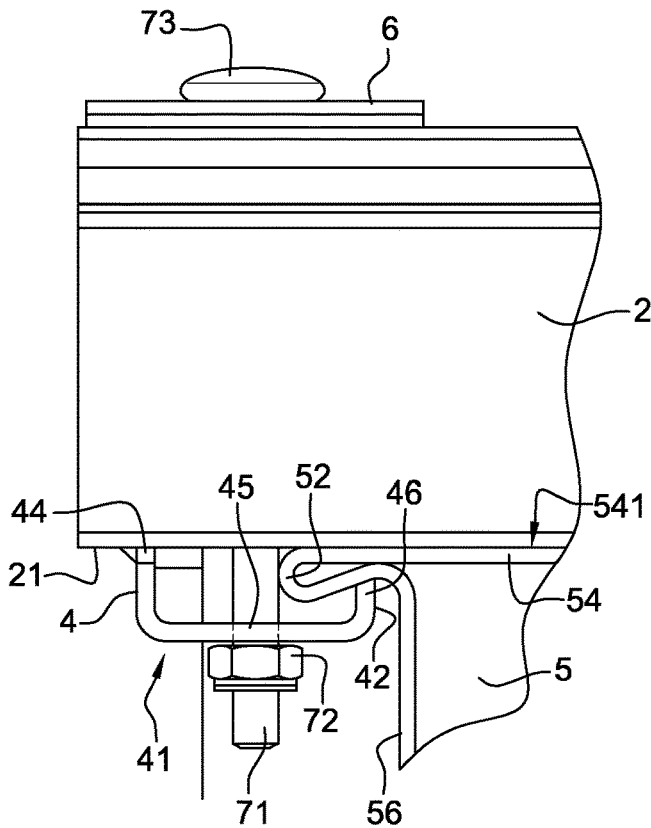
FIG. 4 is a partial front view of the supporting structure in FIG. 1 illustrating the attachment system according to some embodiments.

By way of introduction, a solar module is positioned on a surface and for this purpose includes a base attached to that surface. The base supports a mechanism for orientating the solar module. In addition to this the solar module incorporates means for the processing of solar radiation, such as a set of solar panels 1 mounted on a supporting structure according to some embodiments for the solar module using an attachment system according to some embodiments which we will now describe in greater detail. As a variant, the solar module is a fixed structure.

With reference to FIGS. 1 to 4, a supporting structure for at least one panel according to some embodiments is described below. The supporting structure according to some embodiments includes at least one longitudinal member 5 extending along a first direction parallel to a longitudinal axis of longitudinal member 5. Longitudinal member 5 is here a beam. Longitudinal member 5 is hollow and in cross-section has a generally enclosed rectangular geometrical shape. Longitudinal member 5 includes a wall 51 formed from a sheet of thin metal material. Longitudinal member 5 includes two sides 55 and 56 which extend at a distance from each other and are connected together by a top side 54 and a bottom side 57. The metal material of the sheet is preferably a conductor of electricity, such as steel, aluminium or one of their alloys. Longitudinal member 5 is obtained by an extrusion process or by a process for roll forming the sheet of metal material which is then tacked and/or welded 53 to itself at the longitudinal lateral edges so as to form bottom side 57. As a variant, this tacking or welding may form any other side of the longitudinal member. Longitudinal member 5 includes a folded edge 52 projecting laterally from the length of top side 54 of one of lateral sides 56 of longitudinal member 5. Folded edge 52 is constructed by folding the sheet of material, providing a folded edge 52 which is of one piece with the remainder of longitudinal member 5. This edge may also instead be the place where the section is closed (by tacking or welding). Finally top side 54 includes a bearing surface 541 which extends along folded edge 52.

The supporting structure according to some embodiments is intended to receive at least one panel 1, such as for example a solar panel. Panel 1 preferably includes a metal frame 2 which has a lower surface 21 in the figures. When panel 1 is placed on the supporting structure according to some embodiments, lower surface 21 of frame 2 bears against bearing surface 541 of longitudinal member 5, a longitudinal axis of the frame is then substantially perpendicular to the longitudinal axis of longitudinal member 5. In the case of solar panel 1, frame 2 of panel 5 is of metal conducting electricity and can therefore provide earthing for the solar panel.

In order to hold panel 1 in place on longitudinal member 5 the supporting structure according to some embodiments includes at least one attachment system 3 according to some embodiments. Attachment system 3 according to some embodiments includes an upper flange 6, a lower retaining plate 4 and a tightening assembly 7, 72 including a bolt 7 and a nut 72.

Flange 6 is generally "T"-shaped in cross-section including an upright member 61 topped by a capping member whose edges 62 extend perpendicularly to upright 61. In the embodiment illustrated here upright 61 has a "U"-shaped cross-section. The base of upright 61 of flange 6 has at least one opening suitable for receiving bolt 7 of the tightening assembly. Bolt 7 includes a head 73 at one extremity and a thread 71 at the other extremity. Thread 71 is intended to act together with nut 72.

Retaining plate 4 is here of "U"-shaped cross-section. It includes a substantially flat base 41 incorporating a through hole 45 through which threaded part 72 of bolt 7 will pass. Laterally retaining plate 4 includes a first upturned edge 42 extending substantially at right angles from a lateral edge of base 41. First upturned edge 42 includes at the top a first set of teeth 46 orientated as an extension of first upturned edge 42. On another lateral edge of base 41 opposite the above lateral edge the retaining plate includes a second upturned edge 43 extending substantially at right angles from the other lateral edge of base 41 in a manner which is substantially parallel to first upturned edge 42 and facing it. Second upturned edge 43 includes at the top a second set of teeth 44 orientated as an extension of second upturned edge 43. Second upturned edge 43 further includes at its top a spacer 45 which also extends along an extension of second upturned edge 43. Spacer 45 is located at the middle of second set of teeth 44 and extends above them. Spacer 45 is of a width substantially equivalent to one width of upright 61 of flange 6. Preferably first upturned edge 42 is of shorter height than the height of second upturned edge 43. The difference in height between first upturned edge 42 and second upturned edge 43 of retaining plate 4 is of the order of the thickness of folded edge 52 of longitudinal member 5.

Figure 5:
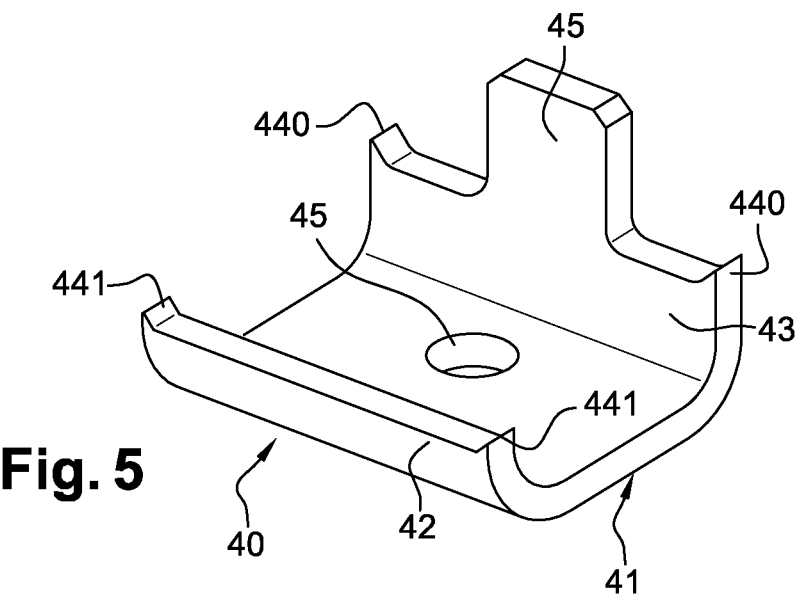
FIG. 5 is a three-dimensional view of a variant embodiment of a retaining plate for the attachment system according to some embodiments.

In another embodiment illustrated in FIG. 5, retaining plate 40 differs from retaining plate 4 previously described in that the first upturned edge 42 includes at the top two teeth 441 orientated as an extension of the first upturned edge 42, each located on an edge adjacent to the lateral edge from which first upturned edge 41 extends. These two teeth 441 form a first set of teeth. Likewise, the second upturned edge 43 includes at its top two teeth 440 orientated as an extension of second upturned edge 42, each located on an edge adjacent to the lateral edge from which second upturned edge 43 extends and on either side of spacer 45. These two teeth 440 form a second set of teeth.

In another embodiment, the retaining plate may be of any overall planar shape and includes teeth distributed over at least part of the edges of the generally flat shape of the retaining plate. For example, the retaining plate may be in the form of a cup. In another variant embodiment, regardless of its shape, the retaining plate has no teeth on the edges of the shape. Such a retaining plate may be used to attach panels which do not have a frame, for example.

Regardless of its shape, the retaining plate can be constructed by stamping, bending or moulding.

We will now describe the installation of at least one solar panel 1 on a supporting structure according to some embodiments with an attachment system 3 according to some embodiments which have both been described previously.

Once the supporting structure according to some embodiments has been installed on the base of the solar module including it, at least one solar panel 1 is positioned on the supporting structure according to some embodiments bearing against bearing surface 541 of at least one longitudinal member 5 of the supporting structure according to some embodiments. Solar panel 1 is positioned in such a way that a portion of frame 2 has its longitudinal axis substantially perpendicular to that of longitudinal member 5 and the lower surface 21 of frame 2 bears against bearing surface 541 of longitudinal member 5. Then at least one attachment system 3 according to some embodiments is fitted. Flange 6 is positioned in such a way that one of edges 62 bears against an upper surface of frame 2 of panel 1, a lateral side of upright 61 of flange 6 bearing against the outer lateral surface of frame 2 of panel 1. Retaining plate 4 or 40 is positioned in such a way that first set of teeth 46 or 441 engage an underside of folded edge 52 and some at least of second set of teeth 44 or 440 engage the lower surface 21 of frame 2 of panel 1, spacer 45 extending along the outer lateral surface of frame 2 of panel 1, one side of the spacer possibly bearing against this outer lateral surface of frame 2 of panel 1. Bolt 7 is then fitted: preferably it is threaded through flange 6, through the opening located in the base of upright 61, then through opening 45 in retaining plate 4 or 40. The bolt then extends between flange 6 and retaining plate 4 or 40, along and opposite the outer lateral surface of frame 2 of panel 1. Nut 71 is then placed on the threaded portion 71 of bolt 7 which projects from retaining plate 4 or 40. When nut 72 is tightened, retaining plate 4 or 40 and flange 6 approach each other, first set of teeth 46 or 441 penetrate the thickness of folded edge 52 of longitudinal member 5, second set of teeth 44 or 440 penetrate the thickness of frame 2 of panel 1. This ensures electrical continuity between panel 1 and longitudinal member 5 in order to ensure that the panel 1 is perfectly earthed. Furthermore, when the bolt is tightened, spacer 45 prevents retaining plate 4 or 40 from rotating about a longitudinal axis of bolt 7. As a variant the underside of head 73 of bolt 7 includes at least one flat inserted between the limbs of the "U" shape of upright 61 of flange 6 to hold the bolt 7 rotationally immobile about its longitudinal axis when nut 72 is tightened. It should be noted that such a supporting structure according to some embodiments associated with an attachment system according to some embodiments can simplify the assembly of panels 1 because permanent attachment is effected from below panels 1 (that is to say from the side of the supporting structure and longitudinal members 5) via an access which is thus made easier for tightening (nut 72) from below.

It should be noted that head 73 of bolt 7 bears against the top of frame 2 of panel 1, so flange 6 works in compression and its strength is greatly increased.

When two adjacent panels 1 are fitted, the attachment system 3 according to some embodiments is arranged so as to hold the two panels 1 simultaneously on the supporting structure according to some embodiments in a similar way to that which has just been described. In this case upright 61 of flange 6 and spacer 45 of retaining plate 4 or 40 have an additional spacing role between the two panels 1 which are thus held on the supporting structure according to some embodiments.

Figure 6:
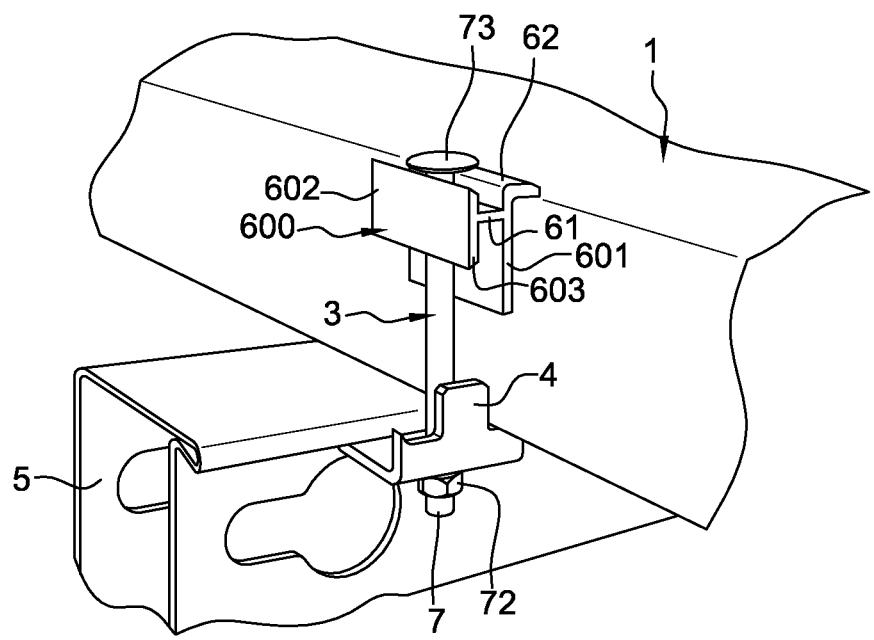
FIG. 6 is a three-dimensional view of a variant embodiment of a flange for the attachment system according to some embodiments.

In another embodiment of flange 600 is illustrated in FIG. 6. This variant embodiment of flange 600 makes it possible to attach a single panel 1 on longitudinal member 5, such as an end panel in a row or column of adjacent panels, in an optimum way. We will now describe the elements which distinguish flange 600 from flange 6 previously described. Flange 600 only includes a single edge 62 extending perpendicularly to "U"-shaped upright 61. The vertical wall of upright 61, at the top of which edge 62 projects, extends downwards below the bottom of upright 61 through a wall 601. Thus, when used as illustrated in FIG. 5, wall 601 bears against a side edge of panel 1 which has to be attached, preventing flange 600 from tipping and making it possible for the attachment to be secured.

Opposite vertical wall 602 of upright 61 has no edge extending perpendicularly to its summit which is however still at the same level as edge 62. Thus, when used as illustrated in FIG. 5, head 73 of bolt 7 bears against the top of opposite vertical wall 602 and of edge 62. As previously, the underside of head 73 of bolt 7 may incorporate at least one flat inserted between the limbs of the "U" shape of upright 61 of flange 600 to hold the bolt 7 rotationally immobile about its longitudinal axis when nut 72 is tightened.

Furthermore, opposite vertical wall 602 extends downwards below the base of upright 61 and ends in an edge 603 of the same material extending perpendicularly towards wall 601. Thus, when attachment system 3 is tightened, the force of head 73 of bolt 7 tends to deform opposite vertical wall 602 so as to open up the "U" shape of upright 61 of flange 600. This deformation is stopped by the force of edge 603 against the shank of bolt 7.

In a variant embodiment attachment element 7, 72 incorporates a structural rivet system. The use of structural rivets ensures better safety and a better hold by the attachment element when it is in use. In addition to this, because of their arrangement the structural rivets can perform an anti-theft function once in place.

Of course, many modifications may be made to some embodiments without thereby going beyond its scope.

The invention claimed is:

1. An attachment system for attaching at least one panel to a supporting structure that includes at least one longitudinal member extending in a first direction, the longitudinal member including a folded edge and a bearing surface of the panel,
   the panel having a surface bearing against the bearing surface of the longitudinal member,
   the attachment system comprising:
      a flange;
      a retaining plate; and
      an attachment assembly attaching the flange to the retaining plate arranged in such a way that on assembly the folded edge of the longitudinal member and the panel bearing against the bearing surface of the longitudinal member are sandwiched together,
   wherein the retaining plate has a first set of teeth projecting substantially parallel to one axis of the attachment assembly in the direction of the flange, the teeth being configured to engage within the folded edge of the longitudinal member by clamping onto it during assembly, and
   wherein the retaining plate includes a second set of teeth projecting substantially parallel to the axis of the attachment assembly in the direction of the flange, this second set of teeth being configured to engage within one edge of the panel by clamping onto it during assembly.

2. The attachment system according to claim 1, wherein the first set of teeth is located on a first edge of the retaining plate.

3. The attachment system according to claim 2, wherein the retaining plate includes a second set of teeth projecting substantially parallel to the axis of the attachment assembly in the direction of the flange, this second set of teeth being configured to engage within one edge of the panel by clamping onto it during assembly.

4. The attachment system according to claim 2, wherein the retaining plate incorporates a projecting spacer projecting substantially parallel to the axis of the attachment assembly in the direction of the flange and arranged in such a way as to bear laterally against an edge of the panel during assembly.

5. The attachment system according to claim 2, wherein the attachment assembly includes a bolt and a nut.

6. The attachment system according to claim 1, wherein the second set of teeth is located on a second edge of the retaining plate.

7. The attachment system according to claim 6, wherein the first and second edges of the retaining plate are substantially parallel to each other and extend opposite each other.

8. The attachment system according to claim 6, wherein the retaining plate incorporates a projecting spacer projecting substantially parallel to the axis of the attachment assembly in the direction of the flange and arranged in such a way as to bear laterally against an edge of the panel during assembly.

9. The attachment system according to claim 7, wherein the retaining plate incorporates a projecting spacer projecting substantially parallel to the axis of the attachment assembly in the direction of the flange and arranged in such a way as to bear laterally against an edge of the panel during assembly.

10. The attachment system according to claim 6, wherein the attachment assembly includes a bolt and a nut.

11. The attachment system according to claim 1, wherein the retaining plate incorporates a projecting spacer projecting substantially parallel to the axis of the attachment assembly in the direction of the flange and arranged in such a way as to bear laterally against an edge of the panel during assembly.

12. The attachment system according to claim 1, wherein the attachment assembly includes a bolt and a nut.

13. The attachment system according to claim 1, wherein the attachment assembly incorporates a structural rivet.

14. A supporting structure for at least one panel, comprising:
   at least one longitudinal member that includes a folded edge;
   a bearing surface for the panel extending in a first direction; and
   at least one attachment system according to claim 1, wherein the longitudinal member includes a thin wall and has a closed cross-section.

15. The supporting structure according to claim 14, wherein the folded edge extends along an extension of the bearing surface.

16. The supporting structure according to claim 14, wherein the thin wall is formed of a shaped metal sheet.

17. The supporting structure according to claim 16, wherein the folded edge is formed by folding or welding the thin sheet onto itself.

18. The attachment system according to claim 1, wherein the retaining plate incorporates a projecting spacer projecting substantially parallel to the axis of the attachment assembly in the direction of the flange and arranged in such a way as to bear laterally against an edge of the panel during assembly.

19. The attachment system according to claim 1, wherein the attachment assembly includes a bolt and a nut.

* * * * *